US006856382B2

(12) United States Patent
Cahill et al.

(10) Patent No.: US 6,856,382 B2
(45) Date of Patent: Feb. 15, 2005

(54) FORMATION OF THREE-DIMENSIONAL VIDEO SEQUENCES WITH A SCANNERLESS RANGE IMAGING SYSTEM

(75) Inventors: Nathan D. Cahill, West Henrietta, NY (US); Lawrence A. Ray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/360,380

(22) Filed: Feb. 6, 2003

(65) Prior Publication Data

US 2004/0156034 A1 Aug. 12, 2004

(51) Int. Cl.[7] .................................................. G01C 3/08
(52) U.S. Cl. ..................................... 356/5.04; 356/5.01
(58) Field of Search ........................ 356/5.04; 348/31; 382/154

(56) References Cited

U.S. PATENT DOCUMENTS

| 3,604,803 | A | * | 9/1971 | Kahn |
| 3,669,541 | A | * | 6/1972 | Duguay |
| 3,682,553 | A | * | 8/1972 | Kapany |
| 3,899,250 | A | * | 8/1975 | Bamberg et al. |
| 3,947,119 | A | * | 3/1976 | Bamberg et al. |
| 4,199,253 | A | * | 4/1980 | Ross |
| 4,920,412 | A | * | 4/1990 | Gerdt et al. |
| 4,935,616 | A | | 6/1990 | Scott ........................... 250/213 |
| 6,118,946 | A | | 9/2000 | Ray et al. ..................... 396/89 |
| 6,349,174 | B1 | | 2/2002 | Ray et al. ................... 396/106 |

* cited by examiner

*Primary Examiner*—Bernarr E. Gregory
*Assistant Examiner*—Brian K Andrea
(74) *Attorney, Agent, or Firm*—David M. Woods

(57) ABSTRACT

A method for generating a range image sequence from a scannerless range imaging system of the type comprising an illuminator for illuminating a scene with modulated illumination; an image modulating component for receiving and modulating the modulated illumination reflected from the scene; an image capture element for capturing images output by the image modulating component, including an image bundle of at least three phase offset images each incorporating a phase delay corresponding to the distance of objects in the scene from the illuminator, wherein each phase offset image of an image bundle also incorporates a phase offset distinct for each image. According to the method, a sequence of three or more phase offset images are acquired that correspond to the modulated illumination reflected from the scene, whereby the sequence contains overlapping subsequences of successive phase offset images, each subsequence forming an image bundle. A range image is then computed using the phase offset images from each corresponding image bundle, thereby forming a range image sequence.

24 Claims, 6 Drawing Sheets

FORMATION OF THREE-DIMENSIONAL VIDEO SEQUENCES WITH A SCANNERLESS RANGE IMAGING SYSTEM

FIELD OF THE INVENTION

The invention relates generally to the field of digital image processing, and in particular to the formation of a three-dimensional image sequence from a moving image bundle captured from a scannerless range imaging system.

BACKGROUND OF THE INVENTION

U.S. Pat. No. 4,935,616 (further described in the Sandia Lab News, vol. 46, No. 19, Sep. 16, 1994) describes a scannerless range imaging system using either an amplitude-modulated high-power laser diode or an array of amplitude-modulated light emitting diodes (LEDs) to completely illuminate a target scene. An improved scannerless range imaging system that is capable of yielding color intensity images in addition to the 3D range images is described in commonly-assigned, U.S. Pat. No. 6,349,174 entitled "Method and Apparatus for a Color Scannerless Range Imaging System". As used herein, a scannerless range imaging system will be referred to as a "SRI system". In the formation of a three-dimensional image (which will herein refer to the combination of the intensity image and range image), the SRI system generates an "image bundle", which includes both the intensity image and a collection of phase offset images which are used to construct the range image. This formation of a three-dimensional image by the SRI system is more fully described in the "Detailed Description of the Invention" section of this disclosure.

The three-dimensional images formed by the SRI system are useful in a variety of applications. In computer graphics, they can be used to construct photorealistic virtual worlds. For example, a prospective buyer could navigate with six degrees of freedom (three degrees due to translation, and three due to rotation) within a photorealistic virtual model of a house that is for sale, the model generated by a collection of three-dimensional images. In forensics, a three-dimensional image permits metrology of the captured scene long after the real scene has been investigated. In computer vision, three-dimensional images from an SRI system can be used in place of the typical stereo imaging design to enhance robot navigation in situations that are dangerous, inaccessible, or costly to humans.

All of these applications benefit from the availability of three-dimensional images of a stationary scene. Other types of applications exist that would benefit from the availability of three-dimensional video sequences (i.e., three-dimensional image sequences indexed in time). For example, three-dimensional video would allow filmmakers to easily incorporate computer graphics objects, such as cartoons or virtual actors, into a video sequence of a real scene in such a way to make the objects appear that they are naturally interacting with the real environment. Knowledge of the depth of objects in a video sequence could be used to aid deletion of objects from the video sequence, or modify lighting or other properties without requiring recapture. A three-dimensional video sequence could also enhance a viewer's experience by allowing the viewer to navigate with six degrees of freedom within the video. However, such a three-dimensional video sequence is beyond the scope of the current SRI system, because the SRI system is only capable of forming single three-dimensional images.

Therefore, there exists a need in the art for a method of generating a three-dimensional video sequence from images captured by a scannerless range imaging system; such a method should have a minimal storage requirement, and be capable of computing each three-dimensional image in the sequence in real time.

SUMMARY OF THE INVENTION

The present invention is directed to overcoming one or more of the problems set forth above in connection with a scannerless range imaging system of the type comprising an illuminator for illuminating a scene with modulated illumination; an image modulating component for receiving and modulating the modulated illumination reflected from the scene; and an image capture element for capturing images output by the image modulating component, including a bundle of at least three phase offset images each incorporating a phase delay corresponding to the distance of objects in the scene from the illuminator, wherein each phase offset image also incorporates a phase offset distinct for each image.

Briefly summarized, according to one aspect of the invention, a method for generating a range video sequence from such a scannerless range imaging system as described above comprises the steps of defining a frame rate, wherein the frame rate is the number of frames of the range video sequence per unit of time; acquiring for each frame a sequence of three or more phase offset images corresponding to the modulated illumination reflected from the scene, whereby the sequence forms an image bundle; and computing for each of the image bundles a range image using phase offset images from the corresponding image bundle, thereby forming a range video sequence.

According to another aspect of the invention, a method for generating a range video sequence from such a scannerless range imaging system as described above comprises the steps of acquiring a sequence of three or more phase offset images corresponding to the modulated illumination reflected from the scene, whereby the sequence contains overlapping subsequences of successive phase offset images, each subsequence forming an image bundle; and computing for each of the subsequences a range image using phase offset images from the corresponding image bundle, thereby forming a range video sequence.

This aspect of the present invention has the advantage of reducing the amount of storage required by utilizing the same phase offset images in the computation of more than one range image in the sequence. Furthermore, the preferred embodiment of the present invention has the advantage of reducing the computational requirement, allowing the range images to be computed in real time.

These and other aspects, objects, features and advantages of the present invention will be more clearly understood and appreciated from a review of the following description of the preferred embodiments and appended claims, and by reference to the accompanying drawings.

DETAILED DESCRIPTION OF THE INVENTION

Because range imaging devices employing laser illuminators and capture devices (including image intensifiers and electronic sensors) are well known, the present description will be directed in particular to elements forming part of, or cooperating more directly with, a method and/or system in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

It is helpful to review the principles and techniques involved in scannerless range imaging. In order to simplify notation, we adopt the convention of zero-based indexing of all sets and arrays. Therefore, a set or vector of length k will be indexed by the nonnegative integers $0, 1, \ldots, k-1$. The upper-left element of a matrix is the $(0,0)$ entry. Likewise, the leftmost column of a $(k \times k)$ matrix is referred to as the zeroth column, the bottom row as the $(k-1)^{st}$ row, etc.

Figure 1:
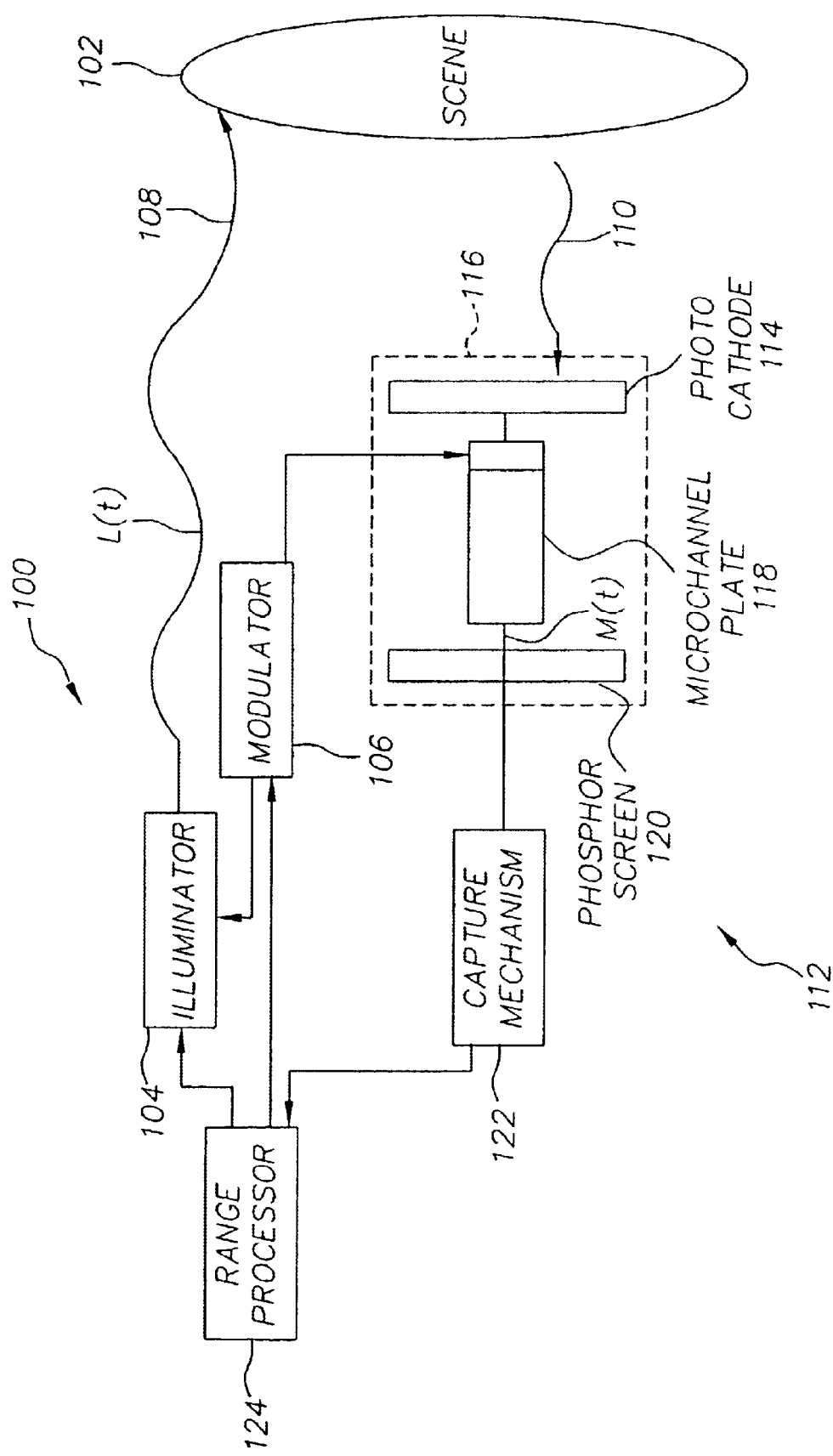
FIG. 1 is a block diagram of a scannerless range imaging system of the type known in the prior art.

Referring to FIG. 1 (prior art), an SRI camera 100 is shown as a laser radar that is used to illuminate 201 a scene 102 and then to capture an image bundle comprising a minimum of three images of the scene 102. An illuminator 104 emits a beam of electromagnetic radiation whose amplitude is controlled by a modulator 106. Typically, in the prior art, the illuminator 104 is a laser device that includes an optical diffuser in order to effect a wide-field illumination and remove modal structure. The modulator 106 provides a sinusoidal modulation. The modulated illumination source is modulated by:

$$L(t)=\mu_L+\eta\sin(2\pi\lambda t) \quad \text{(Equation 1)}$$

where $\mu_L$ is the mean illumination, $\eta$ is the modulus of the illumination source, and $\lambda$ is the modulation frequency applied to the illuminator 104. The modulation frequency is sufficiently high (e.g., 12.5 MHz) to attain sufficiently accurate range estimates. The output beam 108 is directed toward the scene 102 and a reflected beam 110 is directed back toward a receiving section 112. As is well known, the reflected beam 110 is a delayed version of the transmitted output beam 108, with the amount of phase delay being a function of the distance of the scene 102 from the range imaging system. The reflected beam 110 strikes 203 a photocathode 114 within an image intensifier 116, thereby producing a modulated electron stream proportional to the input amplitude variations. The output of the image intensifier 116 is modulated by:

$$M(t)=\mu_M+\gamma\sin(2\pi\lambda t) \quad \text{(Equation 2)}$$

where $\mu_M$ is the mean intensification, $\gamma$ is the modulus of the intensification and $\lambda$ is the modulation frequency applied 207 to the intensifier 116. The purpose of the image intensifier is not only to intensify the image, but also to act as a frequency mixer and shutter. Accordingly, the image intensifier 116 is connected to the modulator 106, causing the gain of a microchannel plate 118 to modulate. The electron stream from the photocathode 114 strikes the microchannel plate 118 and is mixed with a modulating signal from the modulator 106. The modulated electron stream is amplified through secondary emission by the microchannel plate 118. The intensified electron stream bombards a phosphor screen 120, which converts the energy into a visible light image. The intensified light image signal is captured by a capture mechanism 122, such as a charge-coupled device (CCD). The captured image signal is applied to a range processor 124 to determine the phase delay at each point in the scene. The phase delay term $\omega$ of an object at a range $\rho$ meters is given by:

$$\omega = \frac{2\rho\lambda}{c} \bmod 2\pi \quad \text{(Equation 3)}$$

where c is the velocity of light in a vacuum. Consequently, the reflected light at this point is modeled by:

$$R(t)=\kappa\mu_L+\kappa\eta\sin(2\pi\lambda t+\omega) \quad \text{(Equation 4)}$$

where $\kappa$ is the modulus of illumination reflected from the object. The pixel response P at this point is an integration of the reflected light and the effect of the intensification:

$$P = \int_0^{2\pi} R(t)M(t)dt = 2\kappa\mu_L\mu_M + \kappa\eta\pi\gamma\cos(\omega) \quad \text{(Equation 5)}$$

In the range imaging system disclosed in the aforementioned U.S. Pat. No. 4,935,616, which is incorporated herein by reference, a reference image is captured during which time the micro-channel plate is not modulated, but rather kept at a mean response. The range is estimated for each pixel by recovering the phase term as a function of the value of the pixel in the reference image and the phase image.

A preferred, more robust approach for recovering the phase term is described in commonly-assigned U.S. Pat. No. 6,118,946, entitled "Method and Apparatus for Scannerless Range Image Capture Using Photographic Film", which is incorporated herein by reference. Instead of collecting a phase image and a reference image, this approach collects at least three phase images (referred to as an image bundle). This approach shifts the phase 205 of the intensifier 116 relative to the phase of the illuminator 104, and each of the phase images has a distinct phase offset. For this purpose, the range processor 124 is suitably connected to control the phase offset of the modulator 106, as well as the average illumination level and such other capture functions as may be necessary. If the image intensifier 116 (or laser illuminator 104) is phase shifted by $\theta_i$, the pixel response from equation (5) becomes:

$$P_i=2\kappa\mu_L\mu_M\pi+\kappa\eta\pi\gamma\cos(\omega+\theta_i) \quad \text{(Equation 6)}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with distinct phase shifts is sufficient to determine $\omega$. For simplicity, the phase shifts are given by $\theta_k=2\pi k/3; k=0, 1, 2$. In the following description, an image bundle shall be understood to include a collection of images which are of the same scene, but with each image having a distinct phase offset obtained from the modulation applied to the intensifier 116. The image bundle may also include the estimated range image, and any intensity (including color, as described in the aforementioned U.S. Pat. No. 6,349,174, which is incorporated by reference herein) image of the same scene. It should also be understood that an analogous analysis can be performed by phase shifting the illuminator 104 instead of the intensifier 116. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes(the Art of Scientific Computing)*, Cambridge University Press, Cambridge, 1986).

If images are captured with n≧3 distinct phase offsets of the intensifier (or laser or a combination of both) these images form part of the image bundle. Applying Equation (6) to each phase offset image in the image bundle and expanding the cosine term (i.e., $P_i=2\kappa\mu_L\mu_M\pi+\kappa\eta\pi\gamma(\cos(\omega)\cos(\theta_i)-\sin(\omega)\sin(\theta_i))$) results in the following system of linear equations in n unknowns at each point:

$$\begin{pmatrix} P_0 \\ P_1 \\ \vdots \\ P_{n-1} \end{pmatrix} = \begin{pmatrix} 1 & \cos\theta_0 & -\sin\theta_0 \\ 1 & \cos\theta_1 & -\sin\theta_1 \\ \vdots & \vdots & \vdots \\ 1 & \cos\theta_{n-1} & -\sin\theta_{n-1} \end{pmatrix} \begin{pmatrix} \Lambda_0 \\ \Lambda_1 \\ \Lambda_2 \end{pmatrix} \quad \text{(Equation 7)}$$

where $\Lambda_0=2\kappa\mu_L\mu_M\pi$, $\Lambda_1=\kappa\eta\pi\gamma\cos\omega$, and $\Lambda_2=\kappa\eta\pi\gamma\sin\omega$. This system of equations is solved by a singular value decomposition to yield the vector $\Lambda=[\Lambda_0,\Lambda_1,\Lambda_2]^T$. Since this calculation is carried out at every (x,y) location in the phase offset images of the image bundle, $\Lambda$ is really a vector image containing a three element vector at every point. The phase term ω is computed at each point using a four-quadrant arctangent calculation:

$$\omega=\tan^{-1}(\Lambda_2,\Lambda_1) \quad \text{(Equation 8)}$$

The resulting collection of phase values at each point forms the phase image. Once phase has been determined, range r can be calculated by:

$$r = \omega \frac{c}{4\pi\lambda} \quad \text{(Equation 9)}$$

Equations (1)–(9) thus describe a method of estimating range using an image bundle with at least three images (i.e., n=3) corresponding to distinct phase offsets of the intensifier and/or illuminator.

Figure 2:
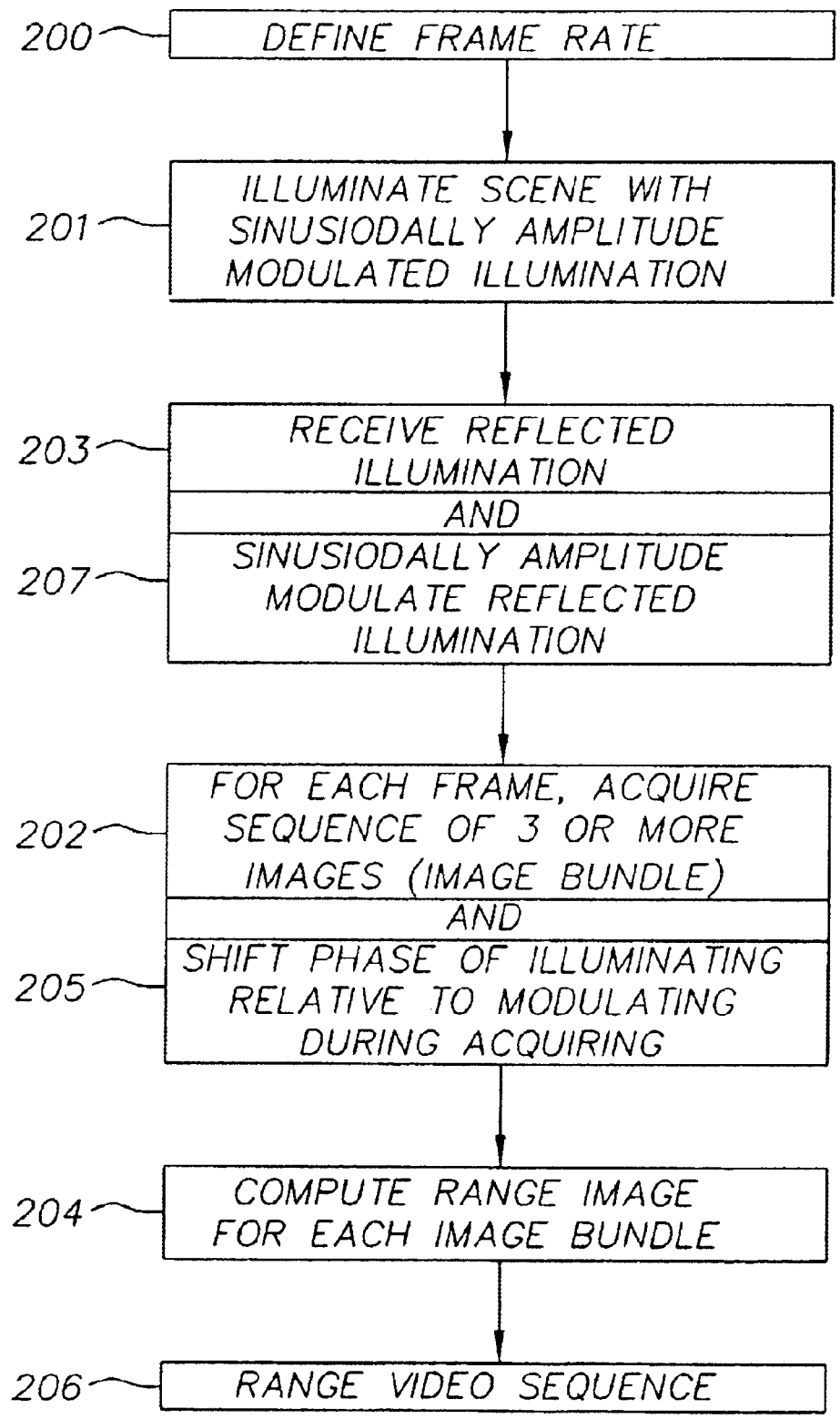
FIG. 2 is a block diagram of a method, according to the present invention, of forming a range video sequence.

Referring now to FIG. 2, the present invention generates a range video sequence from a sequence of image bundles captured by a scannerless range imaging system. In the first step 200, the frame rate for the video sequence is defined. The frame rate is the number of frames, or images, in the video sequence per unit of time. For example, some typical frame rates used in the motion picture industry are 29.97 frames/second for NTSC video, 25 frames/second for PAL video, and 24 frames/second for film. In step 202, for each frame, the SRI system acquires a sequence I={$I_0,I_1,\ldots,I_{M-1}$} of M≧3 phase offset images. The corresponding phase offsets are given by $\Phi=\{\phi_0,\phi_1,\ldots,\phi_{M-1}\}$. Therefore, each frame can be thought of as associated with an image bundle. As was previously mentioned, an image bundle must contain at least three phase offset images, and all of the phase offset values must be distinct. Next, in step 204, for each frame, a range image is computed from the corresponding image bundle, using the technique mentioned in the description of FIG. 1. The computed range images at each frame form a range video sequence, as indicated by block 206. If the intensity images corresponding to each range image are included, then the computed range images augmented with intensity data form three dimensional images, and the video sequence is a three-dimensional video sequence.

Figure 3A:
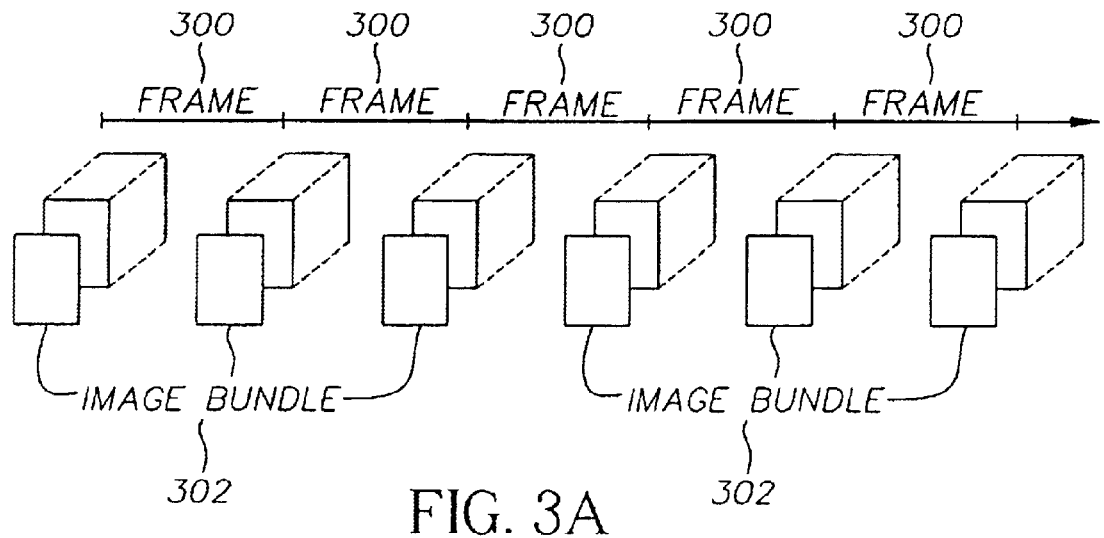
FIGS. 3A and 3B are block diagrams illustrating an embodiment of the present invention.

Referring now to FIG. 3A, the step 202 of acquiring a sequence of phase offset images for each frame is described with respect to an embodiment of the present invention. The frames 300 of the video sequence are spaced with a frequency defined by the frame rate 200. At each frame 300, an image bundle 302 comprising a set of three or more distinct phase offset images is acquired. For descriptive purposes, we will assume that the distinct phase offsets are given by $\alpha=\{\alpha_0,\alpha_1,\ldots,\alpha_{k-1}\}$, and that the corresponding phase offset images are given by I={$I_0,I_1,\ldots,I_{k-1}$}. In this embodiment, we will assume that the distinct phase offsets used to capture phase offset images are the same for each frame.

Figure 3B:
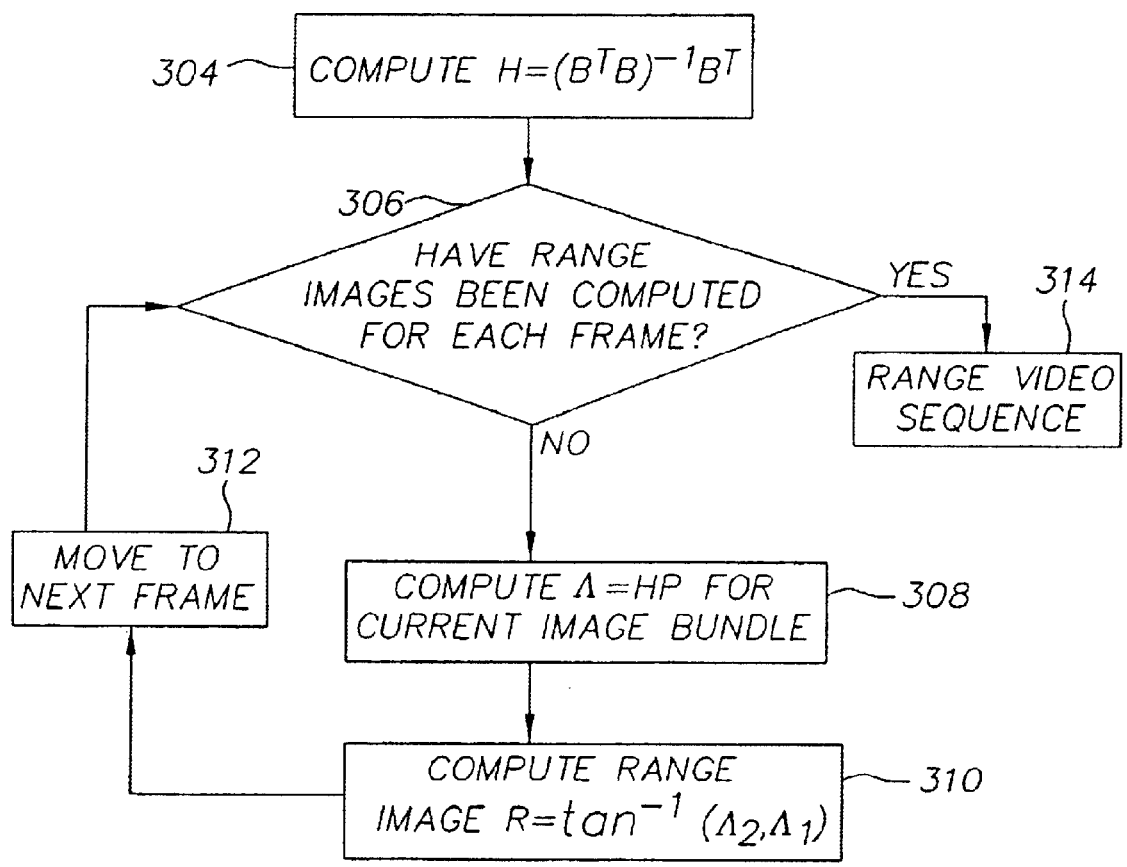

Using the classical method (the method of solving the system of Equation 7), each range image in the sequence can be computed successively. Not including the operations required to form the pseudoinverse of the (n×3) matrix, this method requires 2n multiplications, 2n–2 additions, and one arctangent evaluation per pixel. Referring now to FIG. 3B, an embodiment of the step 204 of computing a range image from each image bundle is described. Define the matrix B as the (k×3) matrix given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

The matrix B may be pre-computed for the range video sequence and used repeatedly for computing each range image. The matrix H satisfying HB=I is computed 304 by any of a variety of different means. For example, H can be computed by the normal equations, $H=(B^TB)^{-1}B^T$. Alternatively, H could be computed by singular value decomposition, QR decomposition, Moore-Penrose pseudoinverse, or any other technique known in the art.

A query 306 is made as to whether range images have been computed for each frame. An affirmative response to query 306 indicates that the process has yielded the range video sequence 314. A negative response to query 306 indicates that the range image must be computed for the current frame. In step 308, the three element vector Λ=HP is formed for each pixel, where P is the vector of corresponding pixel values in the phase offset images shown in Equation 7. In step 310, the range value for each pixel value is computed from the corresponding vector Λ that was output from the previous step. The range value computation is given by: $R=\tan^{-1}(\Lambda_2,\Lambda_1)$. Once the range value has been computed for each pixel, thus forming the range image for the current frame, the process moves 312 to the next frame in the sequence. The entire process is then repeated, starting with query 306, until an affirmative response is made to query 306.

Figure 4:
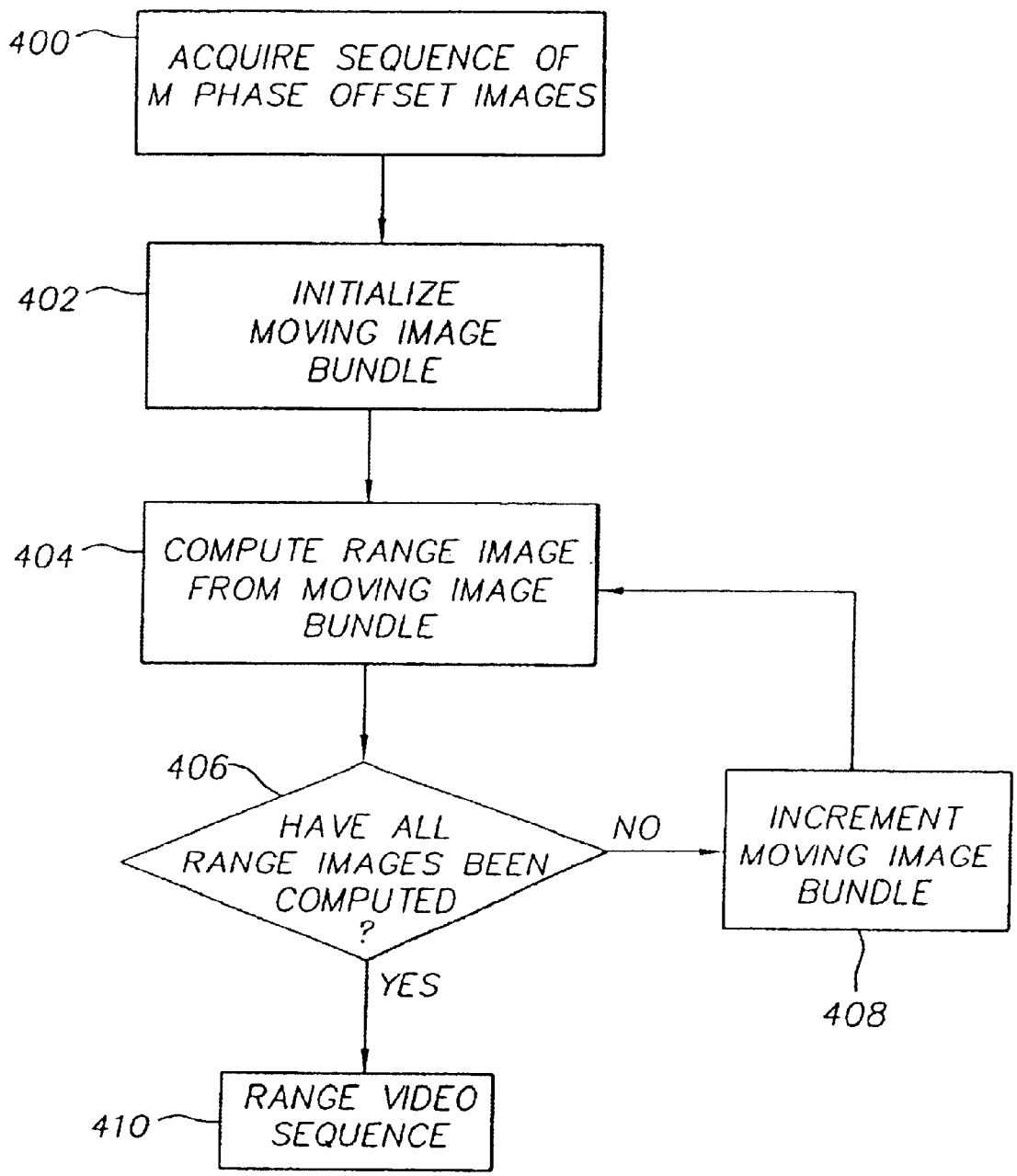
FIG. 4 is a block diagram of a method, according to the present invention, of forming a range video sequence from a moving image bundle.

Referring now to FIG. 4, in another embodiment of the present invention, a range image sequence is generated from a sequence of phase offset images captured by a scannerless range imaging system. In the first step 400, the SRI system acquires the sequence I={$I_0,I_1,\ldots,I_{M-1}$} of M≧3 phase offset images. The corresponding phase offsets are given by $\Phi=\{\phi_0,\phi_1,\ldots,\phi_{M-1}\}$. The sequence of phase offset images acquired in step 400 has the special property that it contains overlapping subsequences of successive phase offset images, where each subsequence forms an image bundle. As was previously mentioned, an image bundle must contain at least three phase offset images, and all of the phase offset values must be distinct. The overlapping subsequences are denoted by $A=\{A_0,A_1,\ldots,A_{n-1}\}$, where $A_j$ contains at least three phase offset images for all $j=0,1,\ldots,n-1$, the $A_j$'s are not mutually exclusive (making them overlapping), and $$\bigcup_{j=0}^{n-1} A_j = I.$$

Next, in step 402, the moving image bundle is initialized to be the image bundle containing the phase offset images in the first subsequence $A_0$, with their corresponding phase offset values. A moving image bundle is an image bundle, where the phase offset images (and corresponding phase offset values) change when the moving image bundle is incremented, successively moving from one overlapping subsequence $A_j$ to the next $A_{j+1}$. Next, in step 404, a range image is computed from the phase offset images of the moving image bundle, using the technique mentioned in the description of FIG. 1. The range image is labeled $R_0$. Next, a query 406 is made as to whether all range images in the sequence have been computed. A negative response to query 406 indicates that the moving bundle is incremented 408. The step 408, query 406, and step 404, are successively repeated, generating range images $R_1, R_2, \ldots, R_{n-1}$, until an affirmative response to query 406 is received. Once n range images have been computed, the response to query 406 must be affirmative. An affirmative response to query 406 indicates that all range images have been computed, resulting in the formation of the range video sequence 410.

Figure 5A:
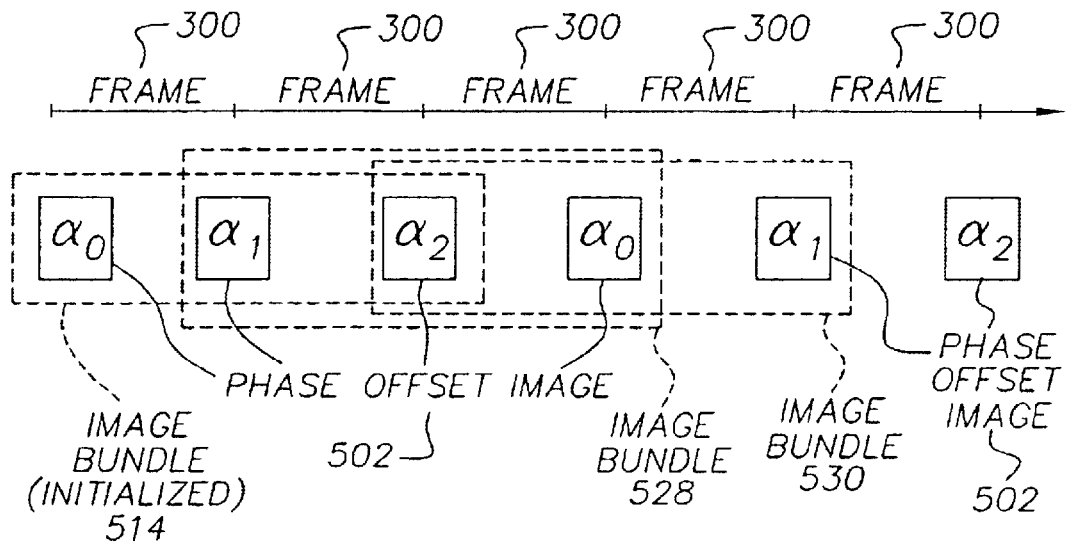
FIGS. 5A, 5B and 5C are block diagrams illustrating an embodiment of the present invention.
Figure 5B:
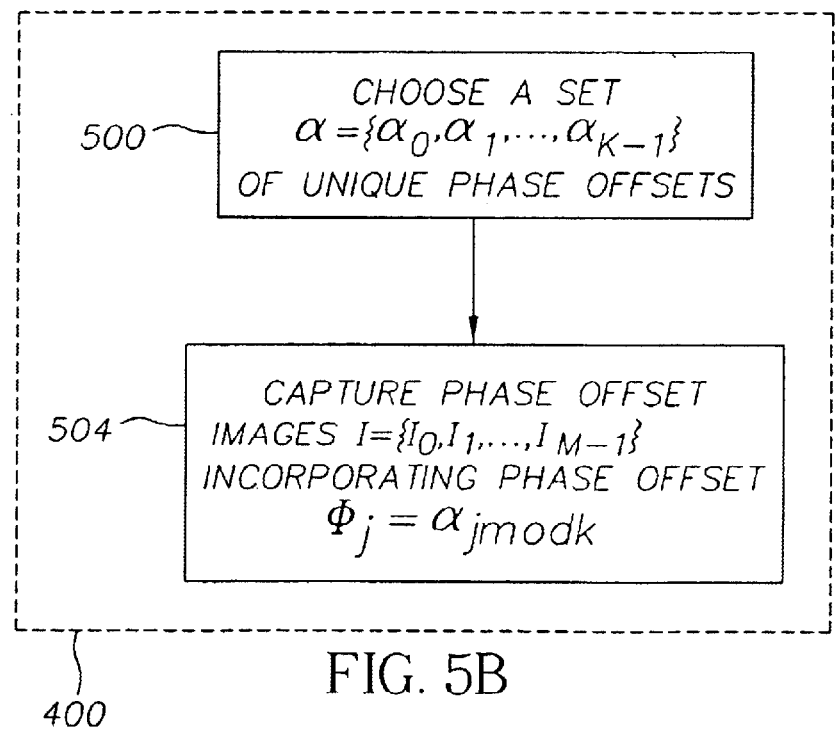

Referring now to FIGS. 5A and 5B, the step 400 of acquiring a sequence of phase offset images is described with respect to the embodiment of FIG. 4. In this embodiment, the step 400 further comprises two steps. First, a set of three or more distinct phase offsets $\alpha=\{\alpha_0,\alpha_1,\ldots,\alpha_{k-1}\}$ is chosen 500. Next, the sequence of three or more phase offset images $I=\{I_0,I_1,\ldots,I_{M-1}\}$ is acquired by capturing 504 each phase offset image $I_j$ 502 with the corresponding phase offset $\phi_j=\alpha_{j\,mod\,k}$. This particular choice of phase offsets will reduce the computational requirement of the step 404 of computing range images that is successively repeated, as will be seen in the description of FIG. 5C.

Consider that the $j^{th}$ range image in the range image sequence has already been computed, using the moving image bundle $A_j$, yielding range image $R_j$. Also consider that during the computation of range image $R_j$, the values of $\Lambda_1$ and $\Lambda_2$ at each pixel have been stored in intermediate images. Instead of using the classical method to compute the next range image $R_{j+1}$, the current intermediate images $\Lambda_1$ and $\Lambda_2$ can simply be updated, and then the arctangent evaluation recalculated. The updating scheme can be derived from the classical method. Let P be the k-vector containing the code values at a specific pixel in phase offset images $I_j, I_{j+1}, \ldots, I_{j+k-1}$, ordered so that the code value at the pixel in phase offset image $I_i$ is placed into the $(i\,mod\,k)^{th}$ position of P. Then $P=B(\Lambda_0,\Lambda_1,\Lambda_2)^T$.

Advancing the image bundle to $A_{j+1}$, the new image bundle no longer contains phase offset image $I_j$, but now contains phase offset image $I_{j+k}$. Therefore, let $\tilde{P}$ be the k-vector that is equal to P, except in the $(j\,mod\,k)^{th}$ position, where it is instead equal to the code value at the pixel in phase offset image $I_{j+k}$. Then it is easily seen that $H\tilde{P}=H(P+(\tilde{P}_{j\,mod\,k}-P_{j\,mod\,k})e_{j\,mod\,k})$, where $e_{j\,mod\,k}$ is the $(j\,mod\,k)^{th}$ column of the identity matrix, and H is the matrix given in the description of FIG. 3A. Distributing H, we see this quantity is equal to $HP+(\tilde{P}_{j\,mod\,k}-P_{j\,mod\,k})He_{j\,mod\,k}$, which in turn is equal to $(\Lambda_0,\Lambda_1,\Lambda_2)^T+(\tilde{P}_{j\,mod\,k}-P_{j\,mod\,k})H_{1,j\,mod\,k}$, where $H_{2,j\,mod\,k}$ is the $(j\,mod\,k)^{th}$ column of H. This shows that given the range image $R_j$ and its intermediate images $\Lambda_1$ and $\Lambda_2$, computation of range image $R_{j+1}$ can be performed by updating $\Lambda_1$ and $\Lambda_2$ by the formulae:

$$\Lambda_1=(\tilde{P}_{j\,mod\,k}-P_{j\,mod\,k})H_{1,j\,mod\,k}+\Lambda_1$$

$$\Lambda_2=(\tilde{P}_{j\,mod\,k}-P_{j\,mod\,k})H_{2,j\,mod\,k}+\Lambda_2,$$

where $H_{m,n}$ refers to the (m, n) element of H, and then subsequently evaluating $\tan^{-1}(\Lambda_2,\Lambda_1)$.

This method of updating the intermediate images $\Lambda_1$ and $\Lambda_2$ and evaluating the arctangent can be performed iteratively to generate successive range images. If the first range image is computed using the classical method, then all successive range images only require two multiplications, three additions, and one arctangent evaluation per pixel. This allows for real time computation of the range image sequence, independent of the number of phase offset images used in each image bundle.

Figure 5C:
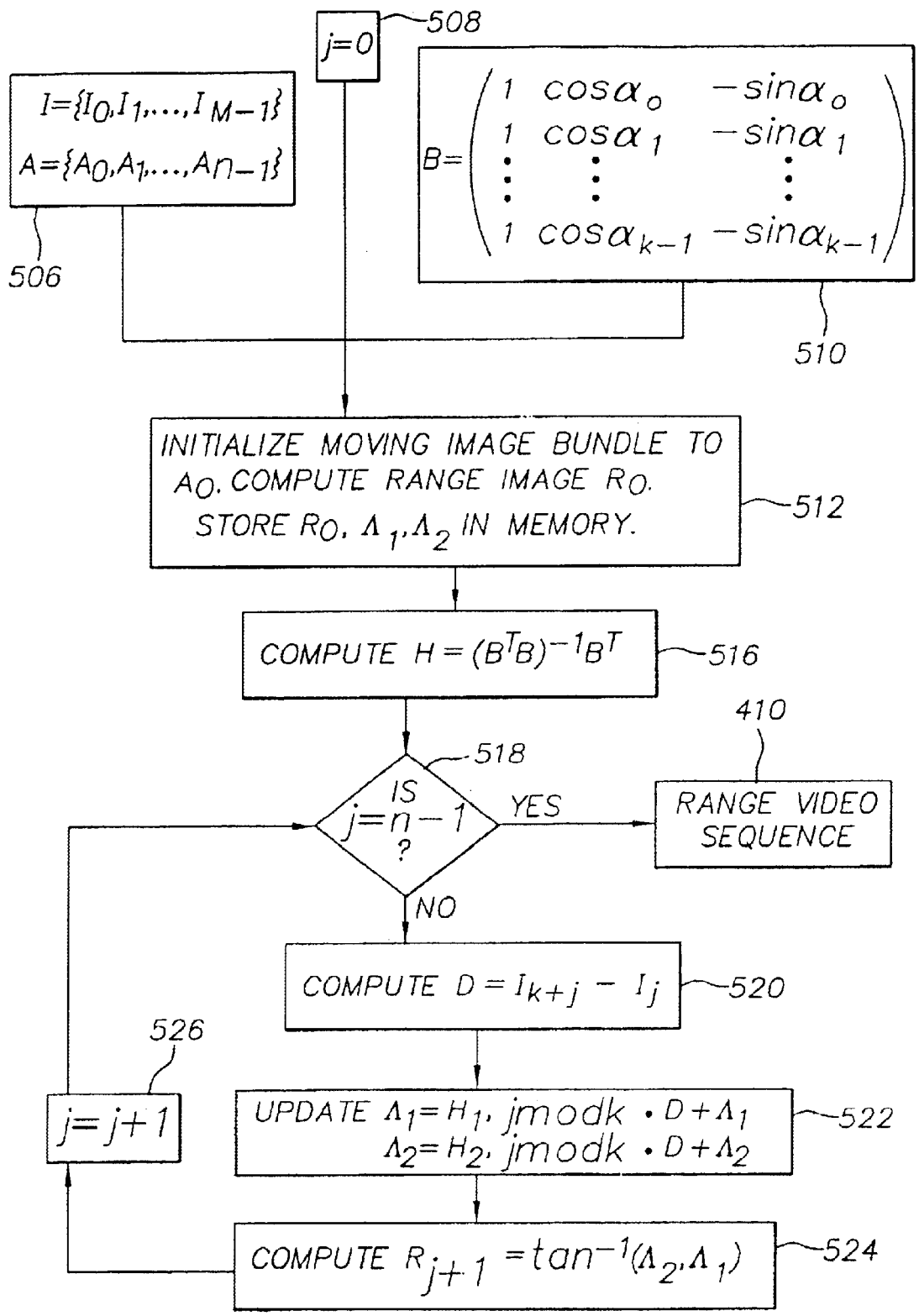

Referring now to FIG. 5C, the steps 404–410 of the present invention are described with respect to the embodiment of FIG. 4. The sequence of acquired phase offset images $I=\{I_0,I_1,\ldots,I_{M-1}\}$ and the associated overlapping subsequences $A=\{A_0,A_1,\ldots,A_{n-1}\}$ are indicated by block 506, a counter j initialized to zero is indicated by block 508, and the matrix B is indicated by block 510. The matrix B is the (k×3) matrix defined above. In step 512, the moving image bundle is initialized to $A_0$ 514, and a range image $R_0$ is computed using the classical method presented in the description of FIG. 1. The range image $R_0$, and the intermediate images $\Lambda_1$ and $\Lambda_2$ (computed from the solution of the system in Equation 7), are stored in memory. In step 516, the matrix H, described above, is computed. Next, a query 518 is made as to whether j=n−1. An affirmative response to query 518 indicates that all range images have been computed, yielding the range video sequence 410. A negative response to query 518 indicates that at least one more range image must be computed. The new range image is computed in the following manner. First, the difference image $D=I_{k+j}-I_j$ is computed 520. Next, the values of intermediate computed images $\Lambda_1$ and $\Lambda_2$ are updated 522 by the formulae $\Lambda_1=H_{1,j\,mod\,k}D+\Lambda_1$ and $\Lambda_1=H_{2,j\,mod\,k}D+\Lambda_2$. Finally, the new range image $R_{j+1}$ is computed 524 at each pixel using the four-quadrant arctangent: $R_{j+1}=\tan^{-1}(\Lambda_2,\Lambda_1)$. Once the new range image has been computed 524, the counter j is incremented 526, and the process returns to query 518. When the counter is incremented 526, the moving image bundle is moved to contain the next subsequence 528, 530, etc., of phase offset images.

The invention has been described in detail with particular reference to certain preferred embodiments thereof, but it will be understood that variations and modifications can be effected within the spirit and scope of the invention.

Parts List

100 SRI camera
102 scene
104 illuminator
106 modulator
108 output beam
110 reflected beam
112 receiving section
114 photocathode
116 image intensifier
118 microchannel plate
120 phosphor screen
122 capture mechanism
124 range processor
200 define frame rate step
202 acquire phase offset images step
204 compute range images step
206 range video sequence
300 frames
302 image bundles
304 compute matrix step
306 query
308 compute Λ step
310 compute range image step
312 move to next frame step
314 range video sequence
400 acquire sequence of phase offset images step
402 initialize moving image bundle step
404 compute range image step
406 query
408 increment moving image bundle step
410 range video sequence
500 choose phase offsets step
502 phase offset images
504 capture phase offset images step
506 phase offset image sequence and overlapping subsequences
508 counter
510 matrix
512 initialize moving image bundle and compute initial range image step
514 moving image bundle
516 compute matrix step
518 query
520 compute difference image step
522 update intermediate image step
524 compute range image step
526 increment counter step
528 moving image bundle
530 moving image bundle

What is claimed is:

1. A method for generating a range video sequence from a scannerless range imaging system of the type comprising an illuminator for illuminating a scene with modulated illumination; an image modulating component for receiving and modulating the modulated illumination reflected from the scene; an image capture element for capturing frames output by the image modulating component, said method comprising the steps of:

defining a frame rate, wherein the frame rate is the number of frames of the range video sequence per unit of time;

illuminating a scene with sinusoidally amplitude modulated illumination;

receiving and sinusoidally amplitude modulating the sinusoidally amplitude modulated illumination reflected from the scene;

acquiring, for each of the frames, three or more successive images of the scene to define an image bundle;

during said acquiring, shifting the phase of said illuminating relative to said modulating, wherein, in each said image bundle, respective said images each have a different phase offset; and computing for each said image bundle a range image using the corresponding phase offset images, thereby forming a range video sequence at the defined frame rate.

2. The method as claimed in claim 1 wherein the step of computing a range image comprises using a system of linear equations at each point in each frame, wherein the system is characterized by a matrix of distinct phase offsets that is pre-computed for the range video sequence and used repeatedly for computing each range image.

3. The method as claimed in claim 2 wherein the distinct phase offsets are given by $\alpha=\{\alpha_0,\alpha_1, \ldots ,\alpha_{k-1}\}$ and the matrix is a (k×3) matrix B given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

4. A method for generating a range video sequence from a scannerless range imaging system of the type comprising an illuminator for illuminating a scene with modulated illumination; an image modulating component for receiving and modulating the modulated illumination reflected from the scene; an image capture element for capturing images output by the image modulating component, said method comprising the steps of:

illuminating a scene with sinusoidally amplitude modulated illumination;

receiving and sinusoidally amplitude modulating the sinusoidally amplitude modulated illumination reflected from the scene;

acquiring a sequence of images of the scene, wherein the sequence contains a plurality of overlapping subsequences of at least three successive images, each of the subsequences defining an image bundle;

during said acquiring, shifting the phase of said illuminating relative to said modulating, wherein said images each have a different phase offset; and computing for each said image bundle a range image using the corresponding phase offset images, thereby forming a range video sequence.

5. A method for generating a range video sequence from a scannerless range imaging system of the type comprising an illuminator for illuminating a scene with modulated illumination; an image modulating component for receiving and modulating the modulated illumination reflected from the scene; an image capture element for capturing images output by the image modulating component, said method comprising the steps of:

illuminating a scene with sinusoidally amplitude modulated illumination;

receiving and modulating the sinusoidally amplitude modulated illumination reflected from the scene;

acquiring a sequence of successive images of the scene;

during said acquiring, shifting the phase of said illuminating relative to said modulating, wherein said images each have a different phase offset;

obtaining overlapping subsequences of phase offset images from the sequence of successive phase offset images, each of the subsequences defining an image bundle of at least three phase offset images each incorporating a distinct phase offset, wherein each image bundle contains at least one phase offset image that is shared with at least one other image bundle from an overlapping one of the subsequences; and computing for each said image bundle a range image using the corresponding phase offset images, thereby forming a range video sequence.

6. The method as claimed in claim 5 wherein the step of acquiring further comprises the steps of choosing a set of three or more distinct phase offsets and applying the set of three or more distinct offsets to the successive phase offset images in a repetitive sequence.

7. The method as claimed in claim 5 wherein the step of computing a range image utilizes a plurality of distinct computations in computing a range image for an image bundle, and at least one of the distinct computations can be reused in computing a range image for at least one other image bundle.

8. The method as claimed in claim 7 wherein the phase offsets are given by $\theta=\{\theta_0, \theta_1, \ldots, \theta_{n-1}\}$ and the step of computing a range image comprises uses a system of linear equations at each point P in each phase offset image, $$\begin{pmatrix} P_0 \\ P_1 \\ \vdots \\ P_{n-1} \end{pmatrix} = \begin{pmatrix} 1 & \cos\theta_0 & -\sin\theta_0 \\ 1 & \cos\theta_1 & -\sin\theta_1 \\ \vdots & \vdots & \vdots \\ 1 & \cos\theta_{n-1} & -\sin\theta_{n-1} \end{pmatrix} \begin{pmatrix} \Lambda_0 \\ \Lambda_1 \\ \Lambda_2 \end{pmatrix}$$

where this system is solved by a singular value decomposition to yield the vector $\Lambda=[\Lambda_0,\Lambda_1,\Lambda_2]^T$.

9. The method as claimed in claim 8 wherein the distinct computation that is reused is one or more of the components of the vector $\Lambda=[\Lambda_0,\Lambda_1,\Lambda_2]^T$.

10. The method as claimed in claim 5 wherein the step of computing a range image comprises using a system of linear equations at each point in each image, wherein the system is characterized by a matrix of distinct phase offsets that is pre-computed for the range video sequence and used repeatedly for computing each range image.

11. The method as claimed in claim 9 wherein the distinct phase offsets are given by a $\alpha=\{\alpha_0,\alpha_1,\ldots,\alpha_{k-1}\}$ and the matrix is a (k×3) matrix B given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

12. A method for generating a range video sequence from a scannerless range imaging system comprising the steps of:

illuminating a scene with sinusoidally amplitude modulated illumination;

receiving and sinusoidally amplitude modulating the sinusoidally amplitude modulated illumination reflected from the scene;

capturing a plurality of sequential frames at a defined rate per unit time, each said frame including an image bundle of at least three images;

during said capturing, shifting the phase of said illuminating relative to said modulating, wherein said images each have a different phase offset; and computing for each image bundle a range image using the corresponding phase offset images to form a range video sequence at the defined frame rate.

13. The method as claimed in claim 12 wherein the step of computing a range image comprises using a system of linear equations at each point in each frame, wherein the system is characterized by a matrix of distinct phase offsets that is pre-computed for the range video sequence and used repeatedly for computing each range image.

14. The method as claimed in claim 12 wherein the distinct phase offsets are given by $\alpha=\{\alpha_0,\alpha_1,\ldots,\alpha_{k-1}\}$ and the matrix is a (k×3) matrix B given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

15. A method for generating a range video sequence from a scannerless range imaging system comprising the steps of:

illuminating a scene with sinusoidally amplitude modulated illumination;

receiving and sinusoidally amplitude modulating the sinusoidally amplitude modulated illumination reflected from the scene;

capturing a sequence of images at a defined rate per unit time;

during said capturing, shifting the phase of said illuminating relative to said modulating, wherein said images each have a different phase offset;

obtaining overlapping subsequences of successive phase offset images from the sequence of images, each of the subsequences defining an image bundle; and computing for each image bundle a range image using corresponding phase offset images to form a range video sequence.

16. The method as claimed in claim 15 wherein the step of computing a range image comprises using a system of linear equations at each point in each frame, wherein the system is characterized by a matrix of distinct phase offsets that is pre-computed for the range video sequence and used repeatedly for computing each range image.

17. The method as claimed in claim 16 wherein the distinct phase offsets are given by $\alpha=\{\alpha_0,\alpha_1,\ldots,\alpha_{k-1}\}$ and the matrix is a (k×3) matrix B given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

18. A method for generating a range video sequence comprising:

illuminating a scene with sinusoidally amplitude modulated illumination;

receiving and sinusoidally amplitude modulating the sinusoidally amplitude modulated illumination reflected from the scene;

capturing a sequence of images at a defined rate per unit time;

during said capturing, shifting the phase of said illuminating relative to said modulating, wherein said images each have a different phase offset;

obtaining overlapping subsequences of phase offset images from the sequence of images, each of the subsequences defining an image bundle of at least three phase offset images each incorporating a distinct phase offset, wherein each image bundle contains at least one phase offset image that is shared with at least one other image bundle from an overlapping one of the subsequences; and computing for each image bundle a range image using corresponding phase offset images to form a range video sequence.

19. The method as claimed in claim 18 wherein said capturing further comprises choosing a set of three or more distinct phase offsets and applying the set of three or more distinct offsets to the successive phase offset images in a repetitive sequence.

20. The method as claimed in claim 18 wherein the step of computing a range image utilizes a plurality of distinct computations in computing a range image for an image bundle, and at least one of the distinct computations can be reused in computing a range image for at least one other image bundle.

21. The method as claimed in claim 20 wherein the phase offsets are given by $\theta=\{\theta_0, \theta_1, \ldots, \theta_{n-1}\}$ and the step of computing a range image comprises uses a system of linear equations at each point P in each phase offset image, $$\begin{pmatrix} P_0 \\ P_1 \\ \vdots \\ P_{n-1} \end{pmatrix} = \begin{pmatrix} 1 & \cos\theta_0 & -\sin\theta_0 \\ 1 & \cos\theta_1 & -\sin\theta_1 \\ \vdots & \vdots & \vdots \\ 1 & \cos\theta_{n-1} & -\sin\theta_{n-1} \end{pmatrix} \begin{pmatrix} \Lambda_0 \\ \Lambda_1 \\ \Lambda_2 \end{pmatrix}$$

where this system is solved by a singular value decomposition to yield the vector $\Lambda=[\Lambda_0,\Lambda_1,\Lambda_2]^T$.

22. The method as claimed in claim 21 wherein the distinct computation that is reused is one or more of the components of the vector $\Lambda=[\Lambda_0,\Lambda_1,\Lambda_2]^T$.

23. The method as claimed in claim 18 wherein the step of computing a range image comprises using a system of linear equations at each point in each image, wherein the system is characterized by a matrix of distinct phase offsets that is pre-computed for the range video sequence and used repeatedly for computing each range image.

24. The method as claimed in claim 23 wherein the distinct phase offsets are given by $\alpha=\{\alpha_0,\alpha_1,\ldots,\alpha_{k-1}\}$ and the matrix is a (k×3) matrix B given by:

$$B = \begin{pmatrix} 1 & \cos\alpha_0 & -\sin\alpha_0 \\ 1 & \cos\alpha_1 & -\sin\alpha_1 \\ \vdots & \vdots & \vdots \\ 1 & \cos\alpha_{k-1} & -\sin\alpha_{k-1} \end{pmatrix}.$$

* * * * *